(12) United States Patent
Diep

(10) Patent No.: US 10,252,738 B2
(45) Date of Patent: Apr. 9, 2019

(54) STROLLER PULLING HANDLE SYSTEM

(71) Applicant: Greg Diep, Austin, TX (US)

(72) Inventor: Greg Diep, Austin, TX (US)

( * ) Notice: Subject to any disclaimer, the term of this patent is extended or adjusted under 35 U.S.C. 154(b) by 0 days.

(21) Appl. No.: 15/598,901

(22) Filed: May 18, 2017

(65) Prior Publication Data

US 2017/0349201 A1    Dec. 7, 2017

Related U.S. Application Data

(60) Provisional application No. 62/343,989, filed on Jun. 1, 2016.

(51) Int. Cl.
  *B62B 9/20* (2006.01)
  *B62B 5/06* (2006.01)

(52) U.S. Cl.
  CPC .............. *B62B 9/20* (2013.01); *B62B 9/203* (2013.01); *B62B 5/061* (2013.01)

(58) Field of Classification Search
  CPC .. B62B 7/06; B62B 7/126; B62B 9/20; B62B 9/203; B62B 5/06; B62B 5/067; B62B 5/064
  See application file for complete search history.

(56) References Cited

U.S. PATENT DOCUMENTS

| | | | | |
|---|---|---|---|---|
| 166,068 A | * | 7/1875 | Caldwell | B62B 5/06 280/124.17 |
| 2,339,646 A | * | 1/1944 | Mann | B62B 5/06 16/422 |
| 2,476,036 A | * | 7/1949 | George | B62B 5/06 16/437 |
| 2,902,286 A | * | 9/1959 | Wood, Jr. | B60N 2/2848 280/31 |
| 3,236,539 A | * | 2/1966 | Ketterer | B62B 3/007 16/113.1 |
| 3,275,337 A | * | 9/1966 | Lau | B62B 3/007 280/47.34 |

(Continued)

FOREIGN PATENT DOCUMENTS

| | | | | |
|---|---|---|---|---|
| DE | 825637 C | * | 12/1951 | ............. B62B 7/126 |
| DE | 29716981 U1 | * | 12/1997 | ............. B62B 9/203 |

(Continued)

*Primary Examiner* — James A Shriver, II
*Assistant Examiner* — Steve Clemmons
(74) *Attorney, Agent, or Firm* — Dean A. Craine

(57) ABSTRACT

A stroller pull handle system that selectively attaches or built into a four or three wheel stroller that allows a stroller to be pulled by a person walking in front of the stroller. In one embodiment, the handle system includes a transversely aligned support bar that extends between stroller's frame members. In another embodiment, the handle member is U-shaped with two legs that attach to pegs that extend perpendicular from the stroller's frame member. In a third embodiment, the handle member is attached to a peg attached to a clip that attaches to the stroller frame. The handle member may be longitudinally aligned and stacked over the stroller frame when not in use. In a fourth embodiment, the handle member includes an upper section and a lower section pivotally attached. The upper section can be rotated in a rearward direction and used for pushing or rotated forward used for pulling.

5 Claims, 16 Drawing Sheets

(56) References Cited

U.S. PATENT DOCUMENTS

| | | | | | |
|---|---|---|---|---|---|
| 3,663,033 | A | * | 5/1972 | Story | B62B 5/06 280/47.17 |
| 4,180,276 | A | * | 12/1979 | Kassai | B62B 7/06 280/47.36 |
| 4,856,744 | A | * | 8/1989 | Frankel | A47G 23/0225 211/113 |
| 4,964,648 | A | * | 10/1990 | Berkowitz | B62B 5/06 16/426 |
| 5,230,523 | A | * | 7/1993 | Wilhelm | B62B 7/12 280/30 |
| 5,375,861 | A | * | 12/1994 | Gifford | B62B 5/068 280/1.5 |
| 5,454,577 | A | * | 10/1995 | Bell | B62B 3/02 280/204 |
| 5,538,267 | A | * | 7/1996 | Pasin | A63H 33/003 280/47.35 |
| 6,059,301 | A | * | 5/2000 | Skarnulis | B62B 9/005 16/113.1 |
| 6,102,432 | A | * | 8/2000 | Cheng | B62B 7/062 280/47.36 |
| 6,341,406 | B1 | * | 1/2002 | Beckman | A61G 1/048 16/113.1 |
| 6,431,556 | B1 | * | 8/2002 | Beardsley | B62B 5/068 224/184 |
| 6,581,245 | B2 | * | 6/2003 | Jen | A45C 13/26 16/334 |
| 6,802,525 | B2 | * | 10/2004 | Smith | B62B 5/06 280/47.34 |
| 6,913,271 | B2 | * | 7/2005 | Gordon | A01K 1/0236 119/453 |
| 6,964,422 | B2 | * | 11/2005 | Crawford | B62B 3/008 280/47.34 |
| 6,991,250 | B2 | * | 1/2006 | Lindsey | B62B 1/12 280/30 |
| 7,007,956 | B1 | * | 3/2006 | Pinon | B62B 5/068 224/184 |
| 7,032,911 | B1 | * | 4/2006 | Shellenberger | B62B 5/06 280/47.371 |
| 7,290,776 | B2 | * | 11/2007 | Pascznk | B62B 5/06 280/47.371 |
| 8,622,404 | B2 | * | 1/2014 | Chen | B62B 9/203 280/47.36 |
| 8,695,992 | B2 | * | 4/2014 | Piaget | B62B 5/0079 280/1.5 |
| 9,010,769 | B1 | * | 4/2015 | Munive | B62B 3/144 280/33.992 |
| 9,168,939 | B2 | * | 10/2015 | Gu | B62B 9/203 |
| 2003/0214107 | A1 | * | 11/2003 | Fernandez | A47B 95/02 280/47.371 |
| 2004/0232660 | A1 | * | 11/2004 | Chen | B62B 3/02 280/651 |
| 2006/0113737 | A1 | * | 6/2006 | Austin | A47D 13/04 280/35 |
| 2008/0296851 | A1 | * | 12/2008 | Hall | B62B 5/068 280/1.5 |
| 2009/0013502 | A1 | * | 1/2009 | Cheng | B62B 5/06 16/429 |
| 2009/0107282 | A1 | * | 4/2009 | Mangham | B62B 5/06 74/491 |
| 2011/0078877 | A1 | * | 4/2011 | Risner | B62B 9/20 16/429 |
| 2012/0326418 | A1 | * | 12/2012 | Ohnishi | B62B 7/066 280/642 |
| 2014/0300079 | A1 | * | 10/2014 | Rhodes | A61G 5/061 280/304.1 |
| 2017/0291658 | A1 | * | 10/2017 | Somerset | B62K 13/00 |

FOREIGN PATENT DOCUMENTS

| | | | | |
|---|---|---|---|---|
| EP | 1481871 | A1 | * 12/2004 | B60B 15/00 |
| FR | 3003801 | B1 | * 2/2017 | B62B 7/126 |
| GB | 174715 | A | * 1/1922 | B62B 9/20 |
| GB | 2465588 | A | * 5/2010 | B62B 9/20 |
| WO | WO-2017044984 | A1 | * 3/2017 | B62B 7/12 |

* cited by examiner

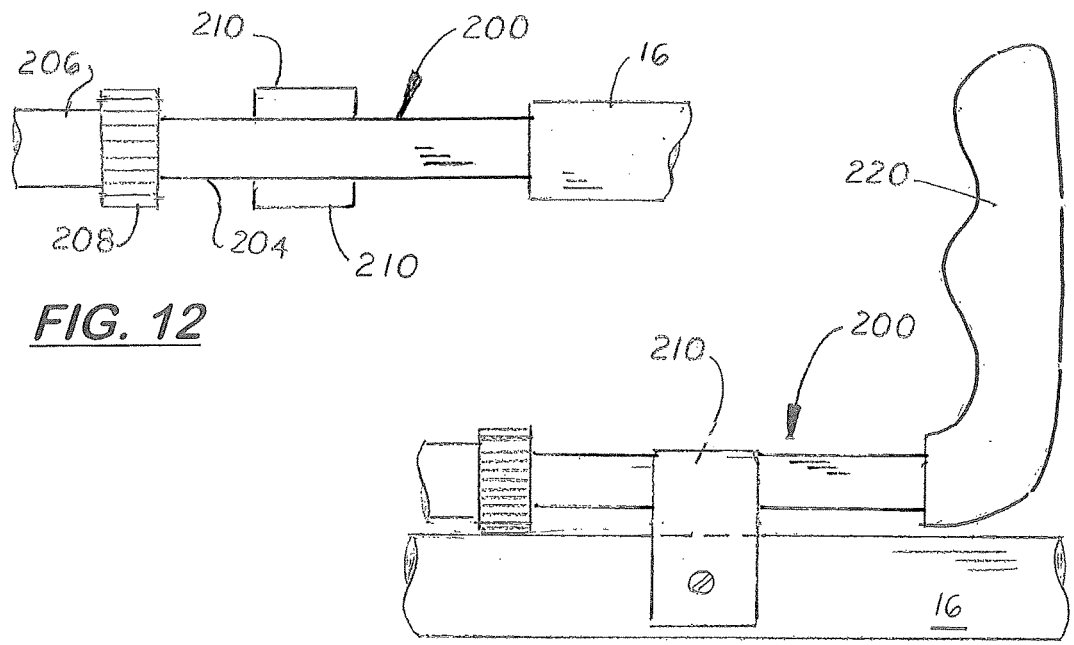
FIG. 12
FIG. 13
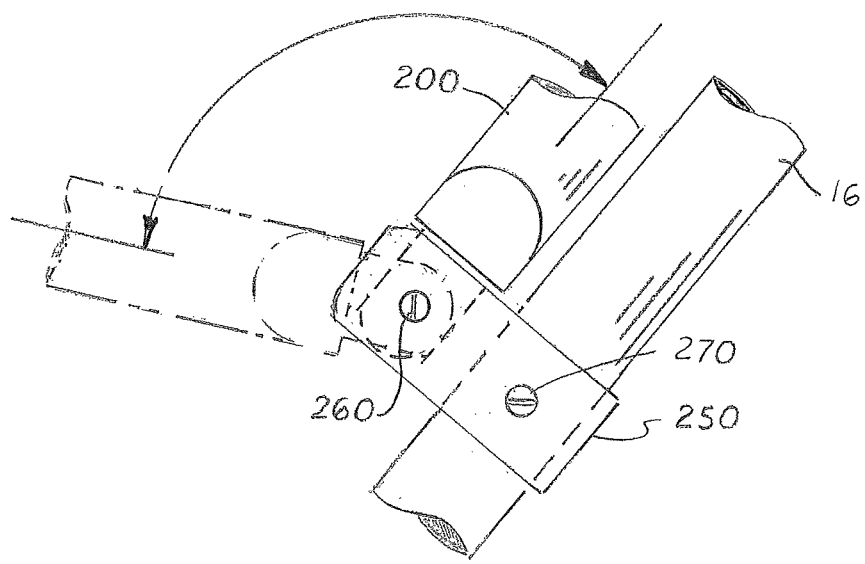
FIG. 14

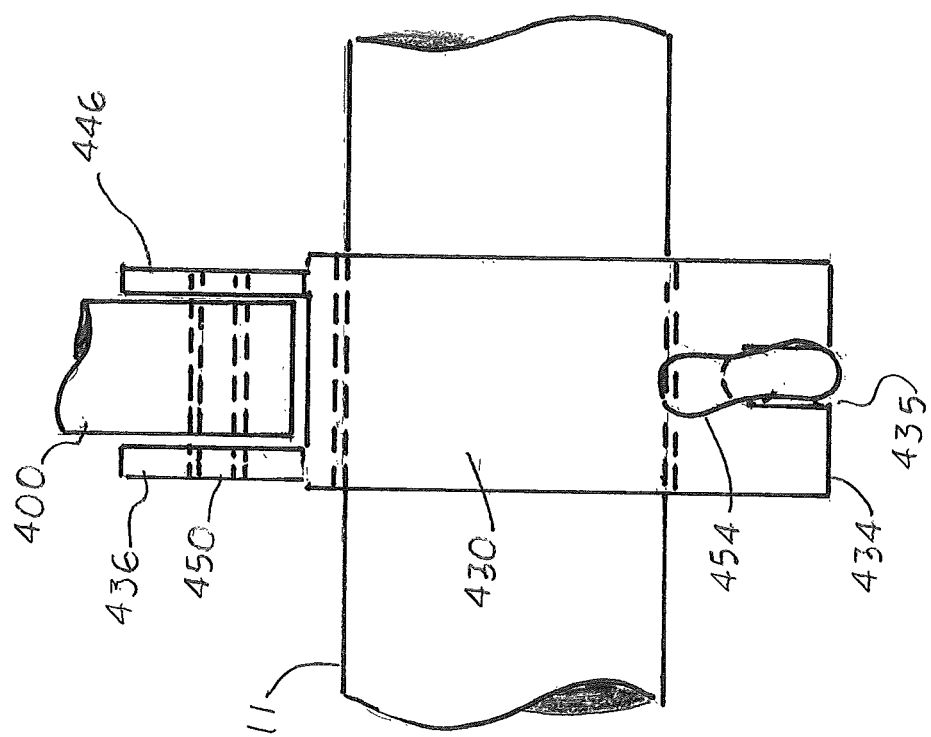

STROLLER PULLING HANDLE SYSTEM

This utility patent application is based on and claims the filing date benefit of U.S. provisional patent application (Application No. 62/343,989) filed on Jun. 1, 2016.

Notice is given that these patent documents contain original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to strollers, and more particularly to strollers with standard rearward extending handles used to push the stroller from behind.

2. Description of the Related Art

When pushing a stroller through a crowd, the person standing behind the stroller must closely watch the path of the stroller so the front wheel or wheels of the stroller do not impact or trip a person walking in front of the stroller. Because the front wheel or wheels on a stroller roll on the ground, people walking in the crowd rarely see the stroller and may inadvertently step directly into the stroller's path. The person pushing the stroller must be vigilant to maintain a safe distance behind a person walking in front of the stroller and for others crossing into the path of the stroller.

Ideally, when two people walk through a crowd with a stroller, one person pushes the stroller while the other person walks ahead of the stroller and as a 'trail blazer'. Unfortunately, not all people remember to coordinate their positions in this manner when walking through a crowd with a stroller. When a single person pushes a stroller through a crowd, a second person acting as a 'trail blazer' is not available.

What is needed is a stroller with standard rearward handles that enables the stroller to be pushed from behind in a normal manner that can be easily adjusted enabling the stroller to be pulled from the front.

SUMMARY OF THE INVENTION

Disclosed herein is a stroller with a secondary handle system configured for pulling the stroller. The secondary handle system includes one or two handles attached to one or two front frame members on a stroller or to the stroller's front cross member that allows the stroller to be pulled by a person walking directly in front of the stroller or alongside and adjacent to the stroller's front wheel or wheels.

In one embodiment, the handle system includes a transversely aligned support bar that extends between the lower sections on the stroller's front frame members. The opposite ends of the support bar are permanently or selectively attached to the front frame members. Attached to the support bar is at least one pivoting handle with an optional hand grip formed on its distal end.

In another embodiment, the handle and support bar are replaced by a single, inverted U-shaped handle with a top member and two vertically aligned legs. The two legs attach to two pegs attached to the front frame members.

In a third embodiment, the handle system includes one or two handle rods that are pivotally attached to one or both frame members. Clips attached to the frame members hold the handle rods in longitudinal alignment over the stroller's frame member when set in a stored, compact configuration. The handle rods are then rotated forward, enabling the stroller to be pulled by a person walking in front of the stroller.

In a fourth embodiment, the handle system includes one or two locking handles on the sides of the stroller that when extended rearward are used to push the stroller and then rotated forward so it may be used for pulling the stroller.

In a fifth embodiment, the handle system is a single handle with a selectively attachable clip configured to attach to the front cross member or from the wheel bracket on a three-wheel stroller.

The above systems are configured so the stroller may be pushed from behind in a normal manner. When desired, the handle systems may be permanently or selectively attached to the stroller and the handle member rotated in a forward direction and used to pull the stroller. In each embodiment, the person can pull the stroller when walking in front or offset to one side. Also, in each embodiment the length of the handle member is fixed or may be telescopically adjusted so a front wheel on the stroller does not clip or impact the puller's feet.

DESCRIPTION OF THE DRAWINGS

FIG. 12 is a partial top plan view of a handle member used in a third embodiment of the handle system in longitudinally alignment with the front frame member and held in a storage configuration.

FIG. 13 is a partial side elevational view of the handle rod in a storage configuration shown in FIG. 12.

FIG. 14 is a side elevational view of a front frame member with a bracket mounted thereon that extends upward and pivotally connects to the proximal end of the handle member.

FIG. 21 is a front elevational view of the clamp shown in FIG. 20.

DESCRIPTION OF THE PREFERRED EMBODIMENT(S)

Figure 1:
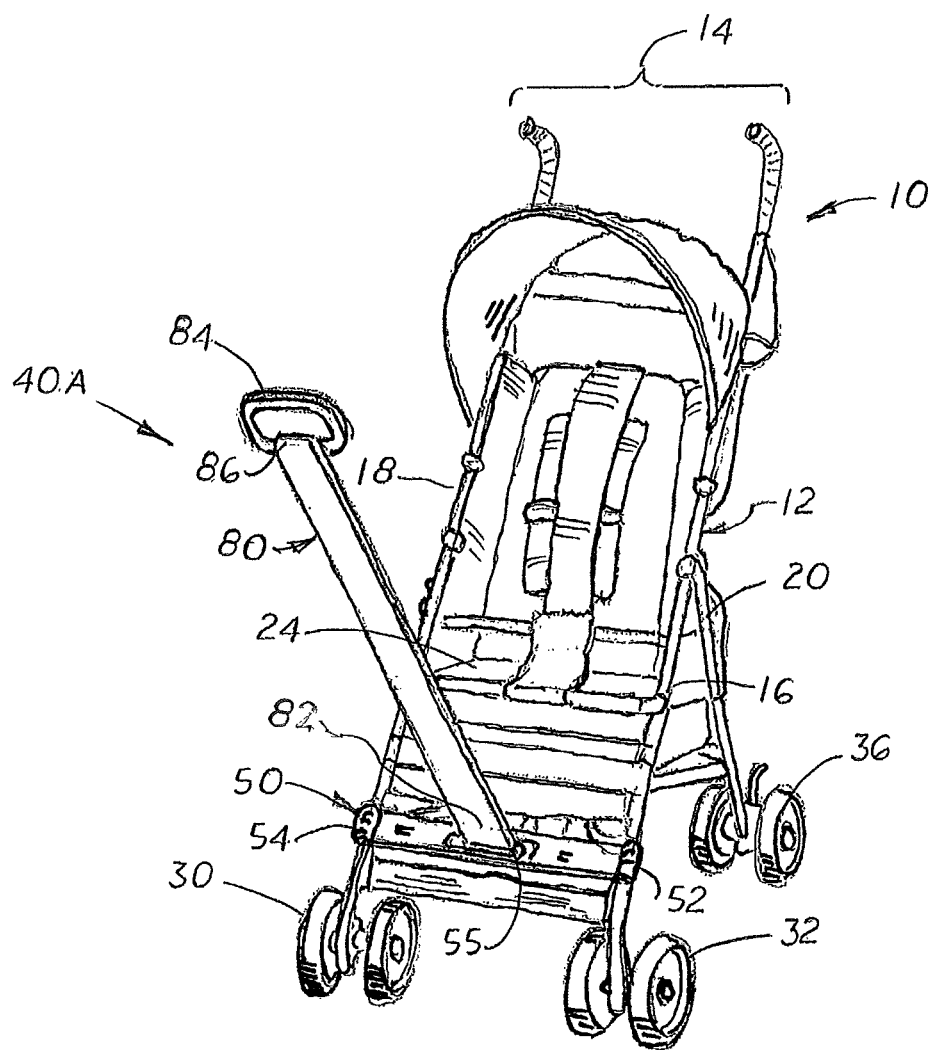
FIG. 1 is a front perspective view of a stroller with a first embodiment of the handle system showing a single handle member mounted on a support bar that extends between two front frame members on the stroller.
Figure 2:
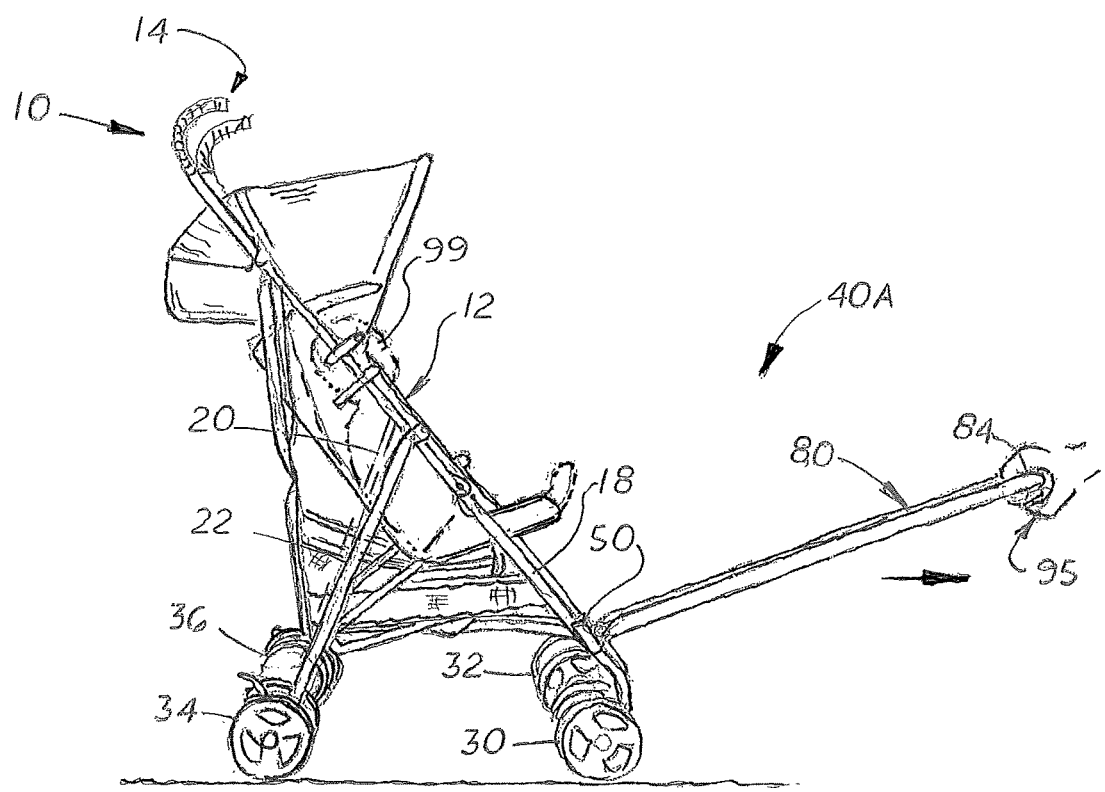
FIG. 2 is a side elevational view of the stroller in FIG. 1 being pulled by a person walking in front of the stroller using the handle member.
Figure 3:
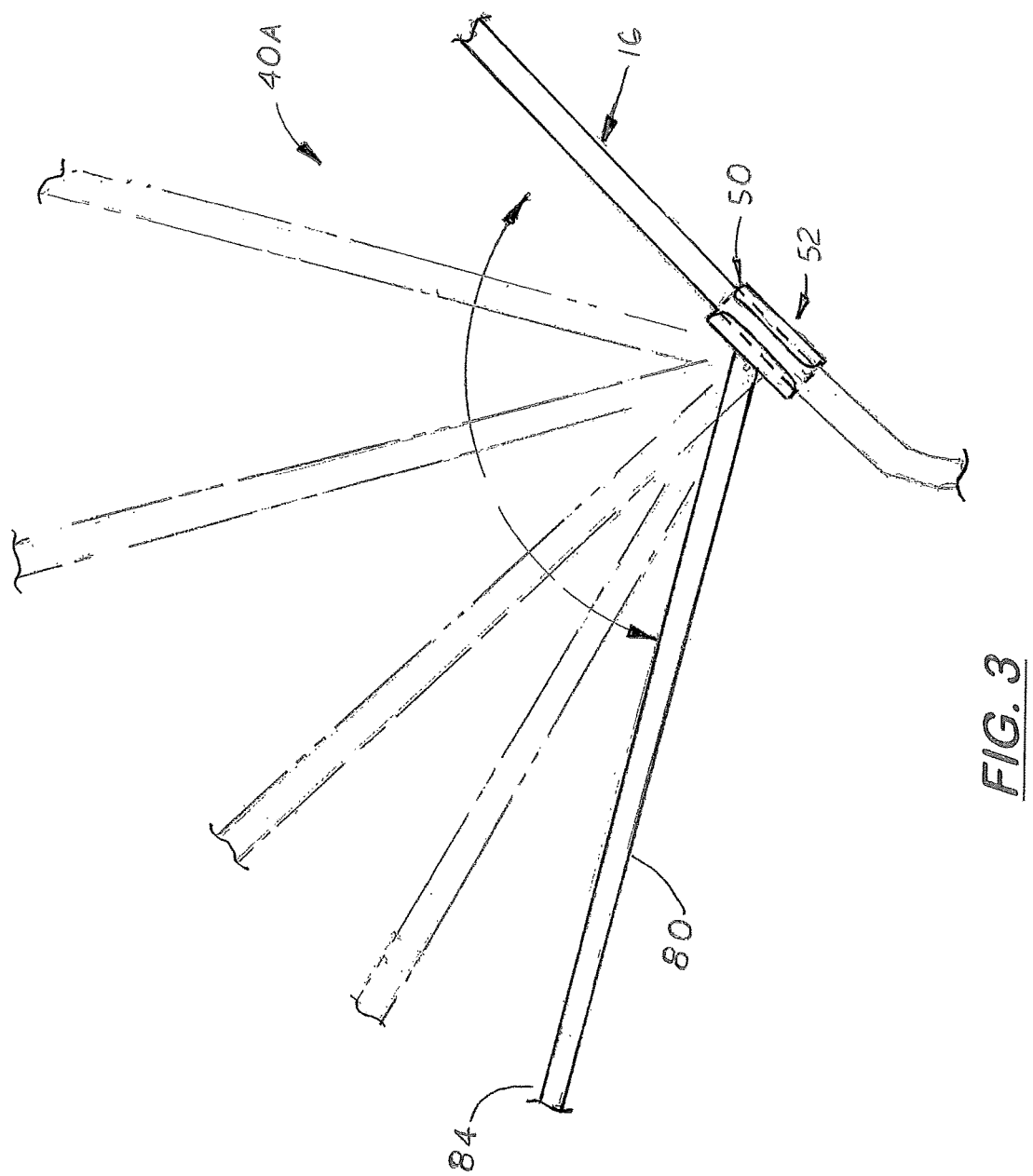
FIG. 3 is an illustration showing the handle member pivoting in an arc over the support bar extended between the two front frame members on a stroller.

Shown in the Figs is a four wheel stroller 10 and a three-wheel stroller 10' both with a rigid frame 12 that includes at least one rear push handle 14, two front frame members 16, 18, a seat 24 supported by the front frame members 16, 18 and configured to support a child 99. Most strollers 10, 10' also include two rear members 20, 22. On the stroller 10, four wheel assemblies 30, 32, 34, and 36 are mounted on the ends of the frame members 16, 18, 20, 22, respectively. The three wheel stroller 10' includes two rear wheels 34, 36 and a large front, center wheel 38. During use, the strollers 10, 10' can be pushed by a person 95 standing behind the stroller 10, 10', or pulled by an person 95 standing alongside the stroller 10, 10' or pulled by a person 95 walking in front of the stroller 10, 10'.

In a first embodiment, the handle system, denoted 40A, includes a transversely aligned support bar 50 that extends between the stroller's two front frame members 16, 18. The opposite ends 52, 54 of the support bar 50 are curved and configured to selectively attach to the front frame members 16, 18, respectively. Formed centrally on the support bar 50 is a hinge assembly 55 coupled to the proximal end 82 of a pivoting handle 80. An optional hand grip 84 is formed on the handle's distal end 86.

Figure 4:
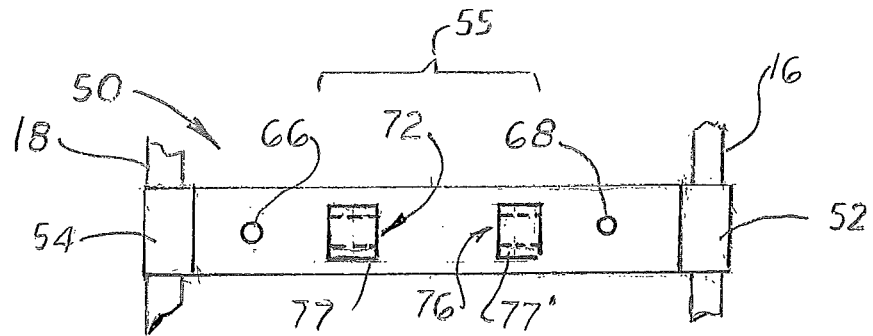
FIG. 4 is a top plan view of the support bar shown extending transversely between the two front frame members on the stroller.
Figure 5:
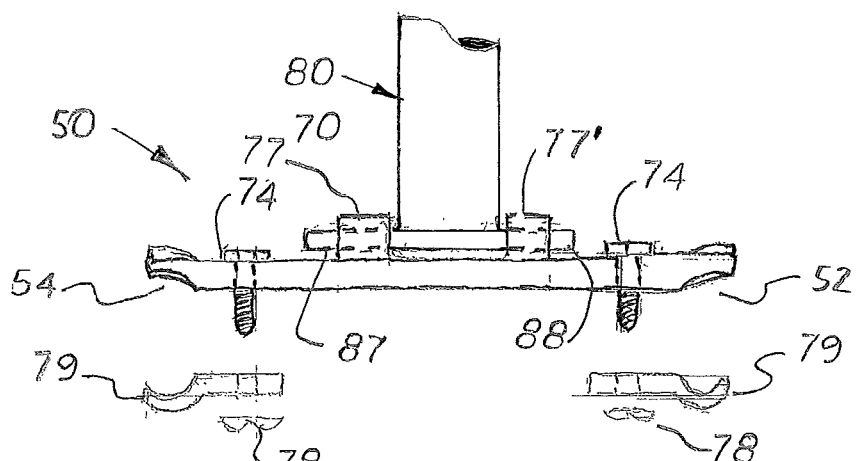
FIG. 5 is a side elevational view of the support bar, the handle, and the clips used to hold the ends of the support bar on the two front frame members.
Figure 6:
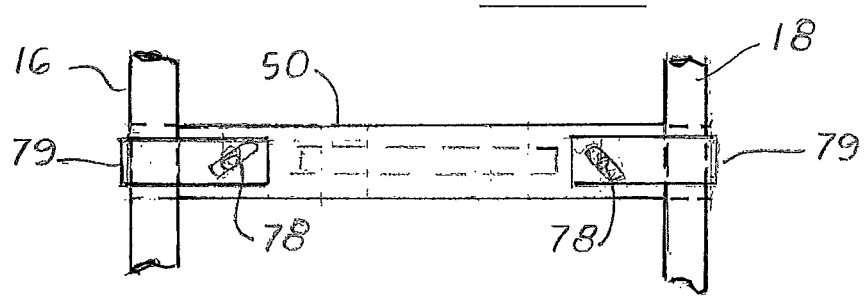
FIG. 6 is a bottom plan view of the support bar attached to the two front frame members.

FIG. 4 is a top plan view of the support bar 50 configured to extend transversely between the stroller's two front frame members 16, 18. As shown in FIGS. 5-6, the support bar 50 is a rigid flat bar with two curved ends 52, 54 that extend over the top round surfaces on the two front frame members 16, 18, respectively. Located inside the ends 52, 54 are bores 66, 68, respectively, (see FIG. 4), that receive carriage bolts 74. The bolts 74 when extended through the bores 66, 68 connect to nuts 78 to hold a J-shaped clip 79 against the bottom surface of the support bar 50 and against the opposite surface of the front frame members 16, 18, respectively.

Formed on the top surface of the support bar 50 are two inverted U-shaped brackets 77, 77'. Formed on the proximal end of the handle member 80 are two pegs 86, 88. During assembly, the handle member 80 is aligned over the top surface of the support bar 50 so the two pegs 86, 88 extend into the two brackets 77, 77' respectively, to pivotally attach the handle member 80 to the support bar 50.

Figure 7:
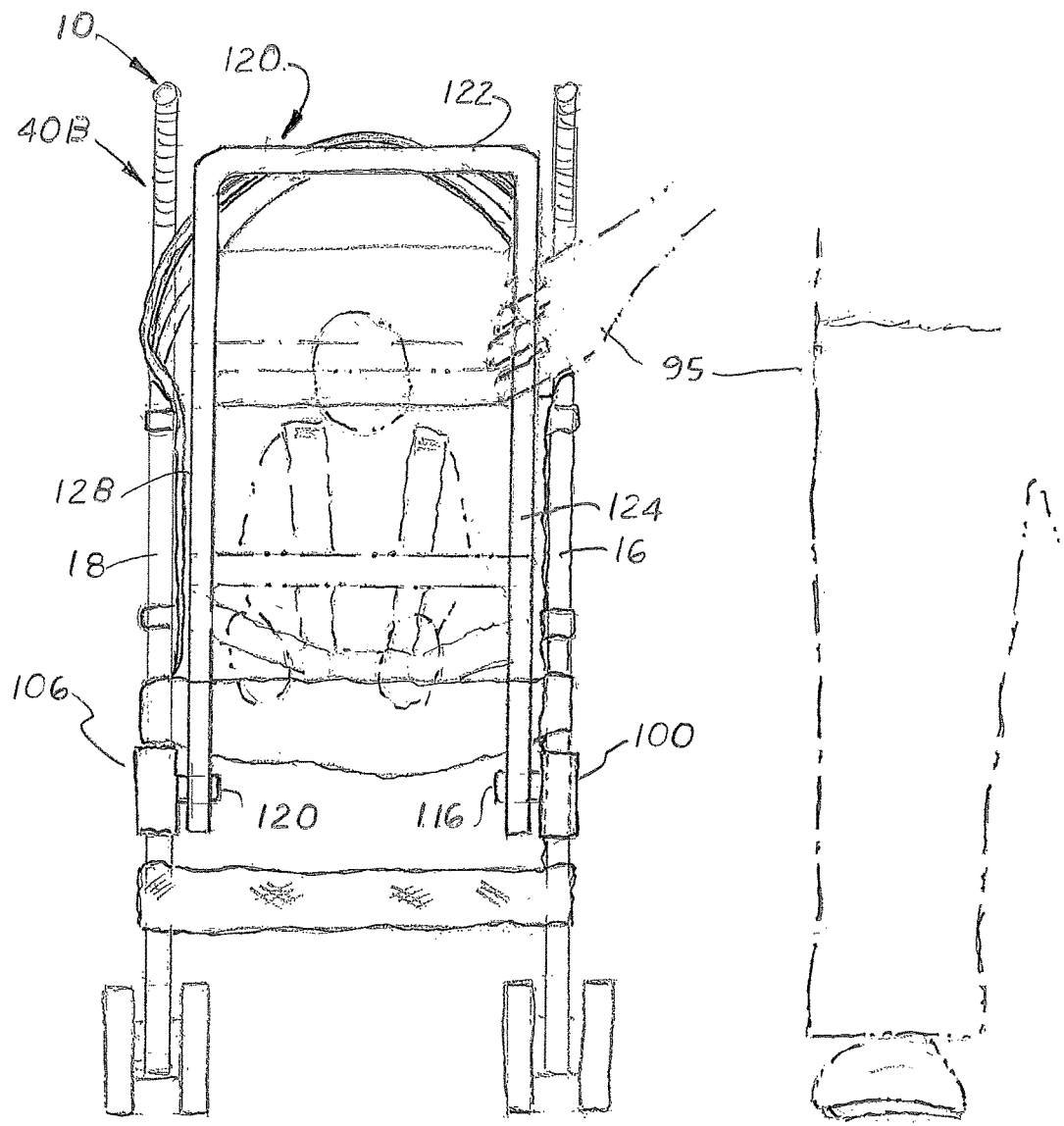
FIG. 7 is a front elevational view of a stroller with the second embodiment of the handle system that includes a U-shaped handle member being pulled by person walking adjacent to the stroller's front wheel.
Figure 8:
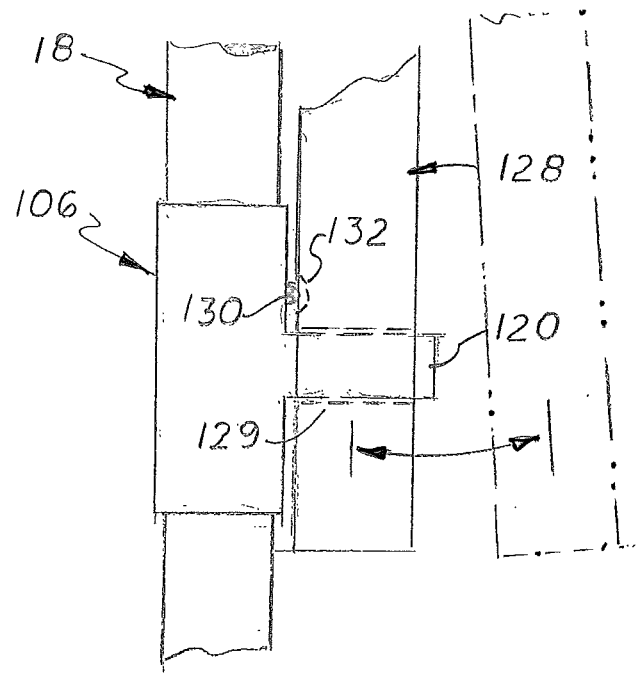
FIG. 8 is a top plan view of a leg on the U-shaped handle member used in the second embodiment of the handle system showing the lower end of a leg on the handle member being attached to a peg that extends perpendicular from a front frame member.
Figure 9:
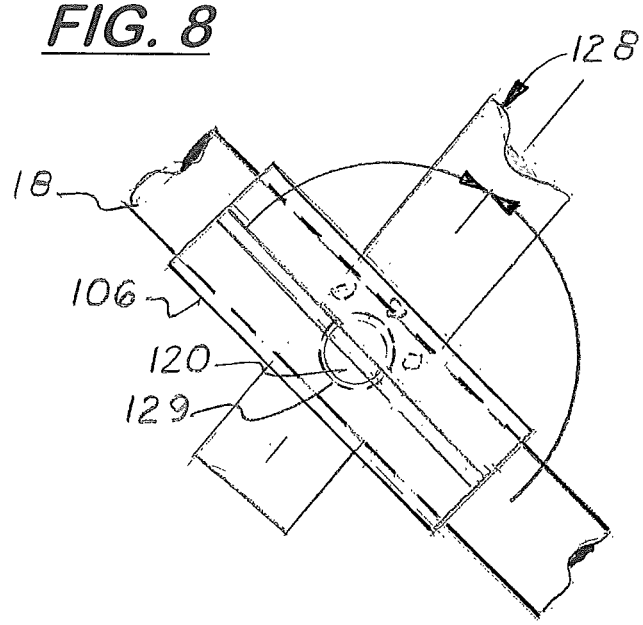
FIG. 9 is a side elevational view of the leg being rotated in arc around a bracket mounted on the front frame support.
Figure 10:
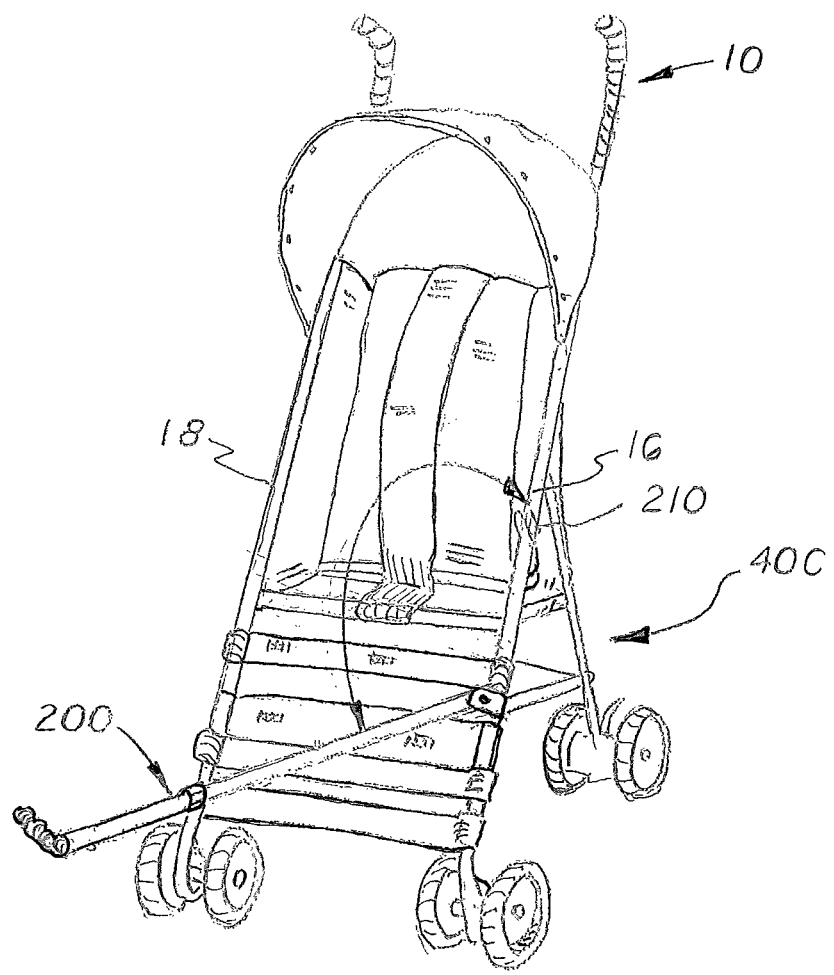
FIG. 10 is a front perspective view of a third embodiment of the handle system that uses J-shaped handle member attached to an upward extending bracket mounted on a front frame member.

In a second embodiment of the handle system, denoted 40B in FIGS. 7-9, in which the support bar 50 and handle member 80 are replaced by two coupler brackets 100, 106 and an inverted U-shaped handle member 120. The handle member 120 includes a top member 122 and two vertically aligned legs 124, 128. The coupler brackets 100, 106 are hollow cylindrical short tubes attached or molded onto the lower section of each front frame member 16, 18. Each coupler bracket 100, 106 includes a laterally extending peg 116, 120 that engages a hole 129 formed on the distal ends of the legs 124, 128, on the handle member 120. Formed on the inside surface of each coupler bracket 100, 106 is an optional projection 130 that engages one of a plurality of voids or detents 132 formed on the outside surface of the legs 124, 128. During use, the projection 130 and detents 132 prevent the handle member 120 from being rotated freely in fore or aft directions.

During use, the legs 124, 128 are biased in a parallel configuration so they resist inward and outward movement forcing the projections 130 against the detents 132. When not in use, the handle member 120 may be removed from the stroller by manually forcing the legs 124, 128 inward, or rotated rearward so the legs 124, 128 are aligned with the front frame members 16, 18.

Figure 11:
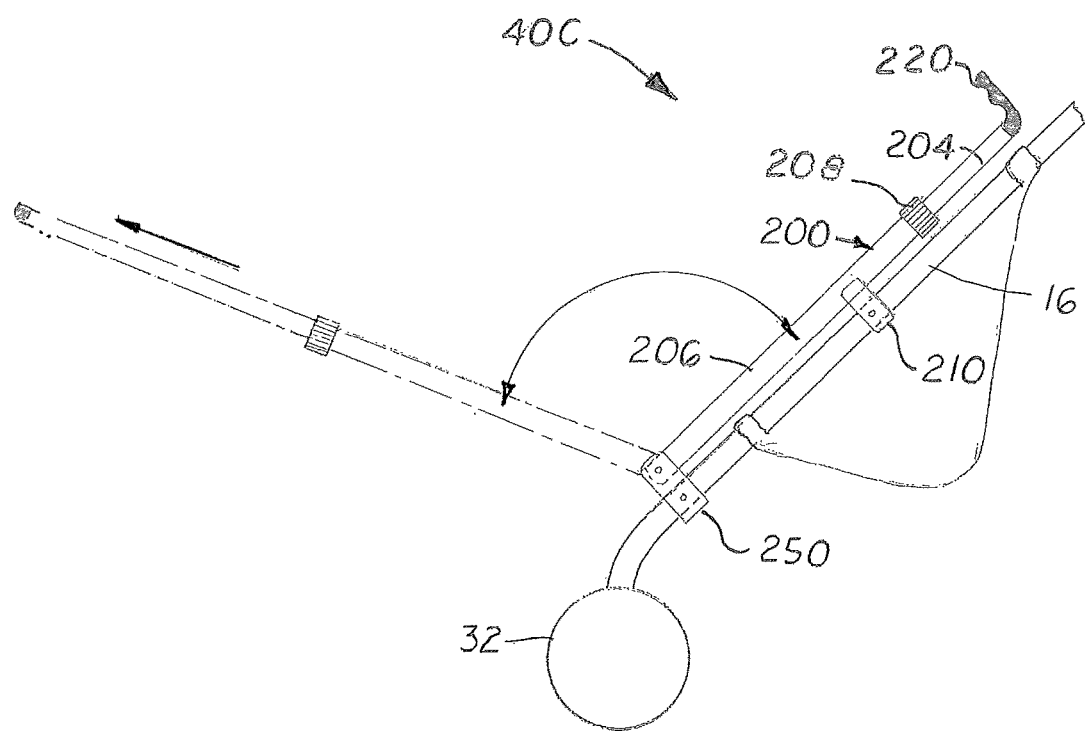
FIG. 11 is a side elevational view of the stroller shown in FIG. 10 showing the handle member retracted in length and in a stacked position over a front frame for storage and then rotated forward into a pulling position and extended in length.

In a third embodiment of the handle system, denoted 40C and shown in FIGS. 10-14, the support bar 50, the handle member 80 and the U-shaped handle member 120 are replaced with one or two fixed or telescopic handle member 200 pivotally attached to one or both front frame members 16 or 18. As shown in FIG. 11, the handle member 200 is stored in a retracted, stacked position over the front frame member and then selectively rotated forward and extended for pulling by a person walking in front of the stroller 10. As shown in FIGS. 12 and 13, a clip 210 is attached either to the handle member 200 or to the front frame member 16 or 18 to hold the distal end of the handle member 200 in a stacked, longitudinally aligned position over the front frame member 16 or 18. Attached to the distal end of the handle member 200 is an optional, laterally extending hand grip 220.

As shown in FIG. 14, the proximal end of the handle member 200 is attached to a second bracket 250 that is attached in a fixed position to the front frame member 16 via a threaded bolt 270 or some other suitable connector. The opposite end of the second bracket 250 extends above the front frame member 16 or 18 and includes a threaded screw or bolt 260 that attaches to the proximal end of the handle member 200 enabling the handle member to rotate approximately 60 degrees over the front frame member 16 or 18.

The handle member 200 may be a fixed length or telescopic in length. The telescopic version of the handle member 200 is shown in FIG. 10-14, and includes two or more longitudinally aligned sliding members 204, 206 that may be selectively locked in position with a turned nut 208 to maintain a desired length. The upper slide member 204 may be rotated to position the hand grip 220 is a desirable comfortable orientation for pulling.

Figure 15:
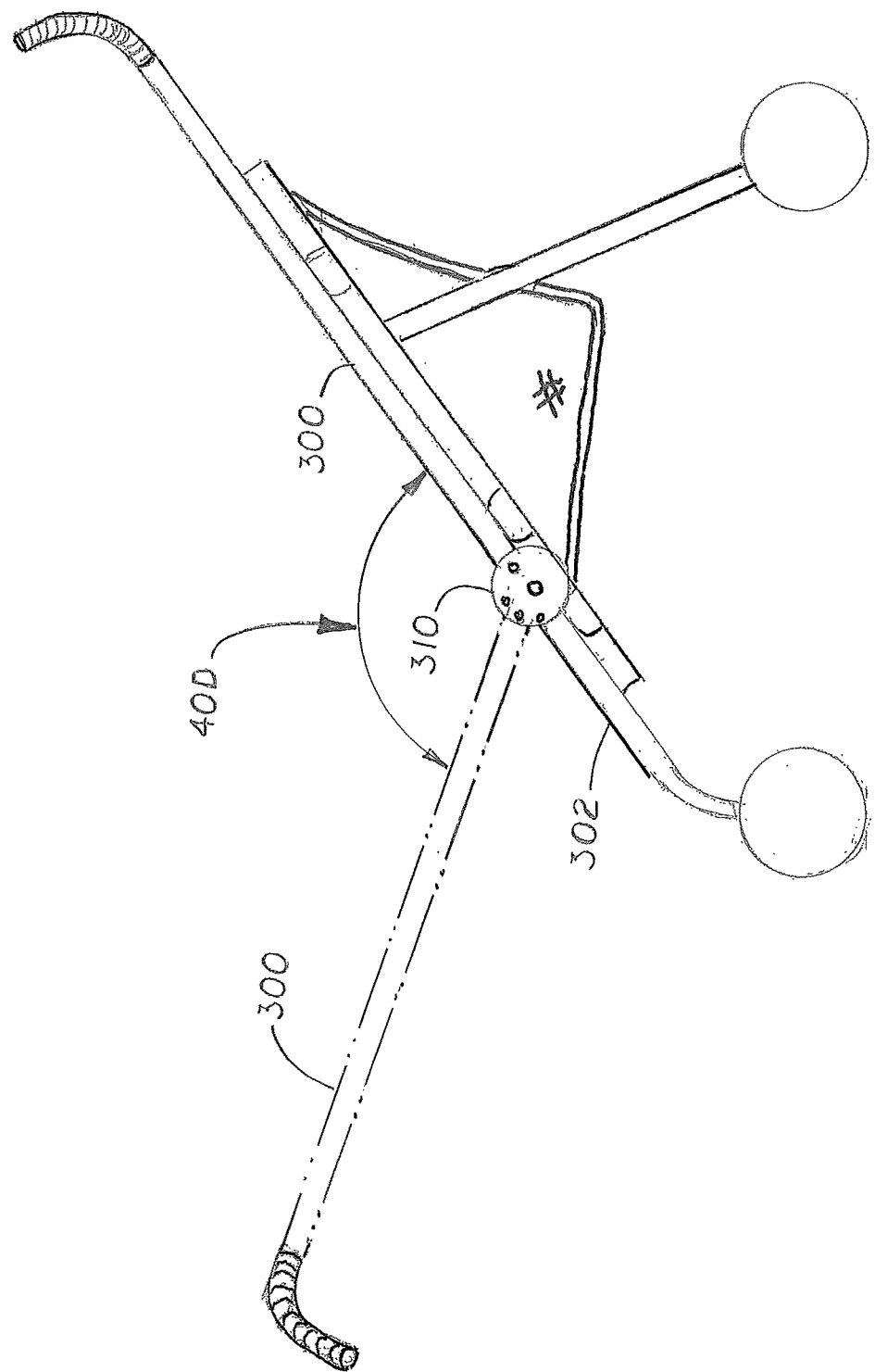
FIG. 15 is a side elevational view of a stroller with a fourth embodiment of the handle system in which the front frame member is modified to an elongated handle section pivotally attached to the end of a short handle section with the elongated handle section being rotated.
Figure 16:
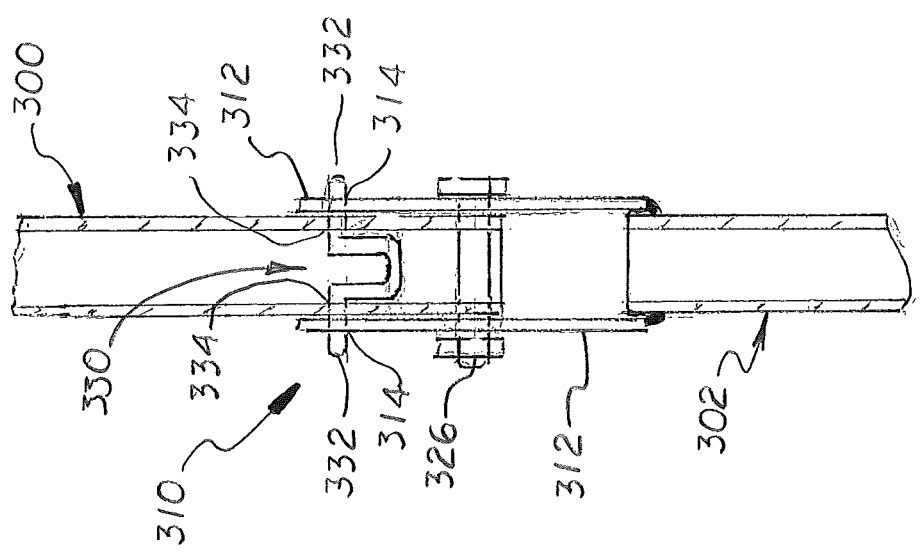
FIG. 16 is a front elevational view of the pivoting joint attached to the stroller shown in FIG. 15.
Figure 17:
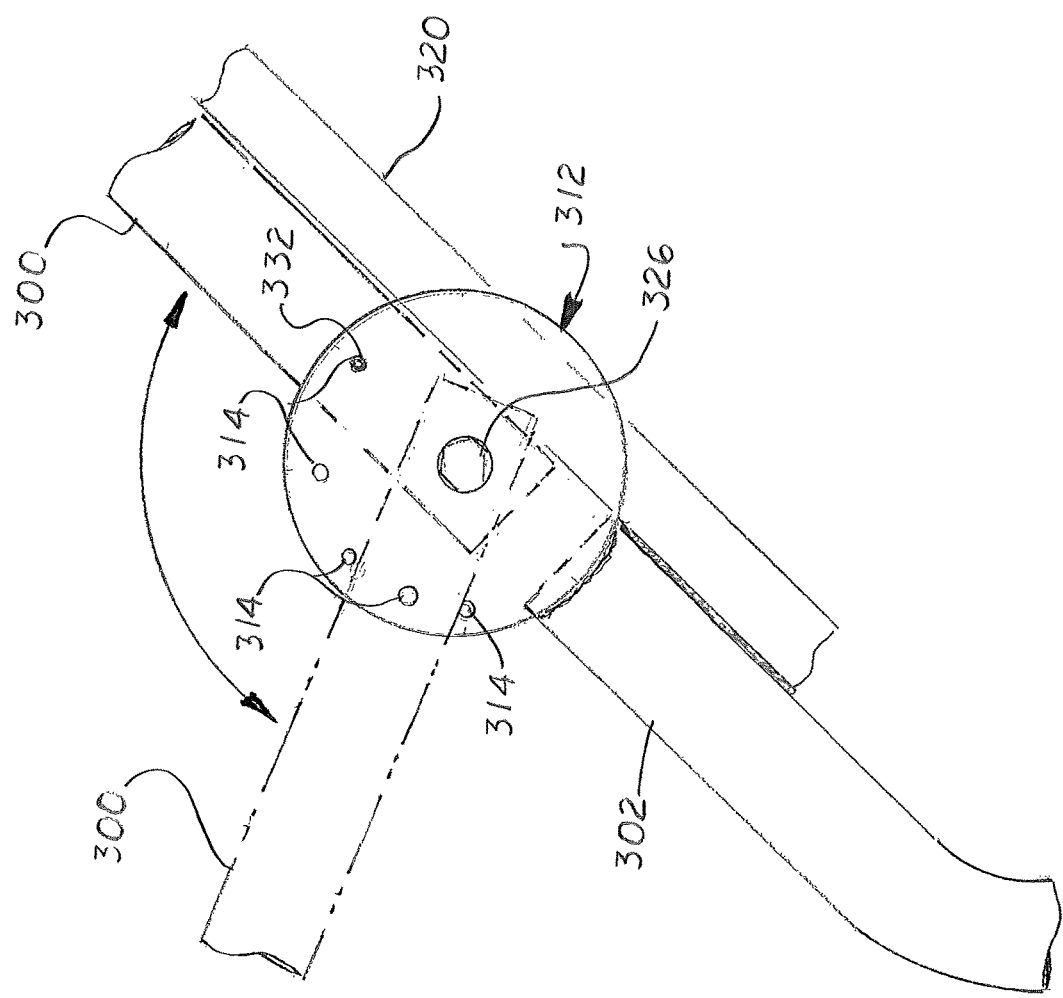
FIG. 17 is a side elevational view of the pivoting joint with a peg extending through a hole formed on the pivoting plates that locks the elongated handle section in a fixed position relative to the short handle section.
Figure 18:
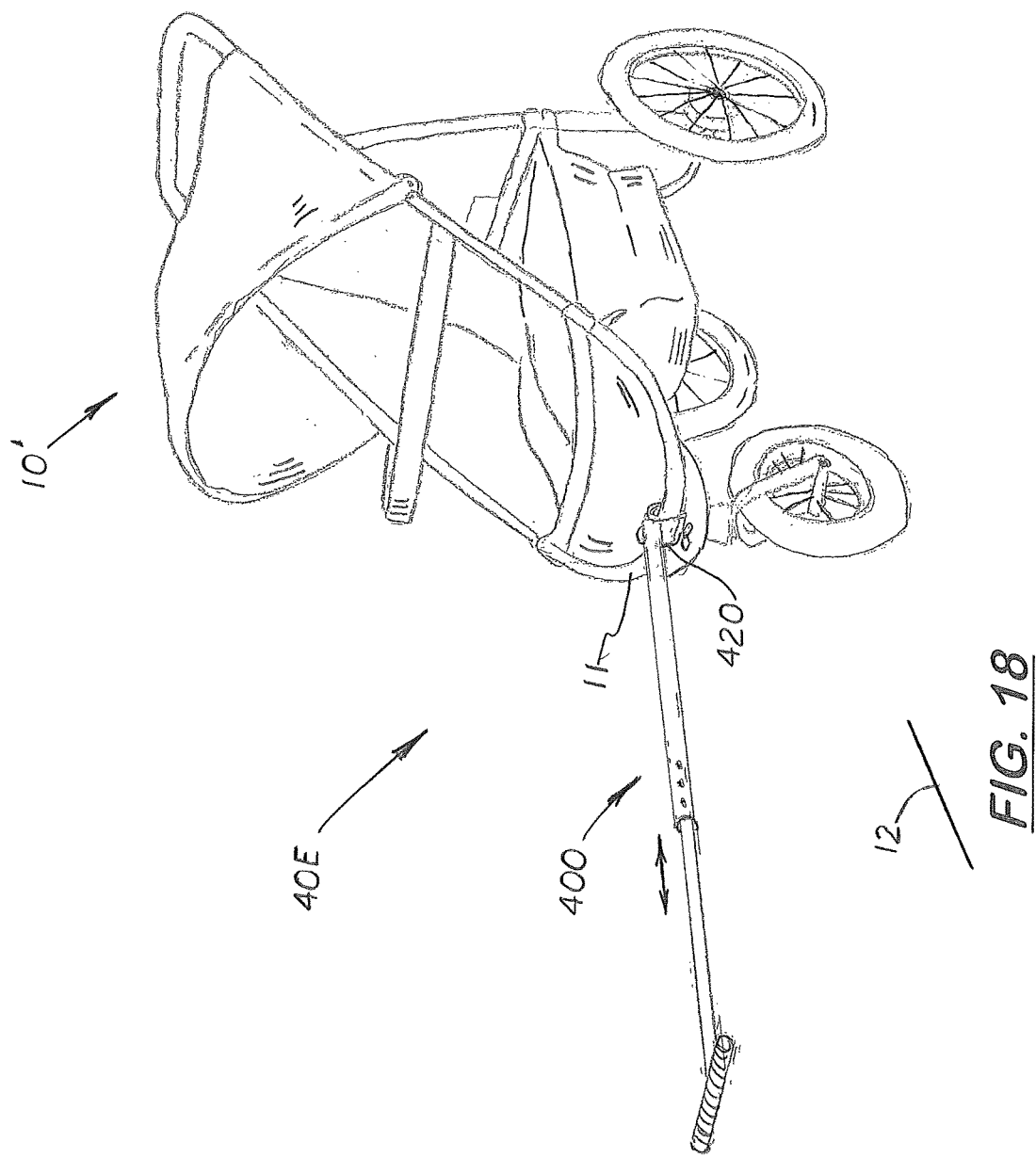
FIG. 18 is a perspective view of a three wheel stroller with a fifth embodiment of the handle system that includes a removable, single, t-shaped handle member attached to the three wheel stroller's front cross member.

FIGS. 15-17 show a fourth embodiment of the stroller 10 with a handle system, denoted 40D, that includes an elongated handle section 300 pivotally attached to the end of a short handle section 302. During use, the elongated handle section 300 is aligned in rearward direction and then selectively rotated to a forward direction. The elongated handle section 300 and short handle section 302 are pivotally connected together via a pivoting joint 310. In the embodiment shown in FIG. 16, the pivoting joint 310 includes two coaxially aligned pivoting plates 312. The plates 312 are aligned parallel welded or securely attached to the upper end and on opposite sides of short handle section 302. Extending through the center axis of the plates 312 is an axle 326 that passes through the lower end of the upper handle section 300. The upper handle section 300 may rotate free around the axle 326. A plurality of holes 314 are radially aligned approximately 15 to 45 degrees apart on each plate 312.

As shown in FIG. 16, disposed inside the lower end of the upper elongated handle section 300 is a push peg assembly 330 with two outward biased pegs 332 that extend through holes 334 formed on the proximal end of the upper elongated handle section 300. When assembled, the two pegs 332 are biased outward and engage the holes 314 on the two pivoting plates 312 to lock the upper elongated handle section 300 in a fixed position.

The handle system may also be used with three wheel strollers 10'. As shown in FIGS. 18-21, the fifth embodiment of the handle system denoted 40E, includes a removable single handle member 400 attached to a three wheel stroller 10' with the handle member 400 attached to the stroller's front cross member 11. The handle system 40E includes a clamp-style bracket 420 comprising two u-shaped sections 430, 440 joined to a center pin 450.

Figure 19:
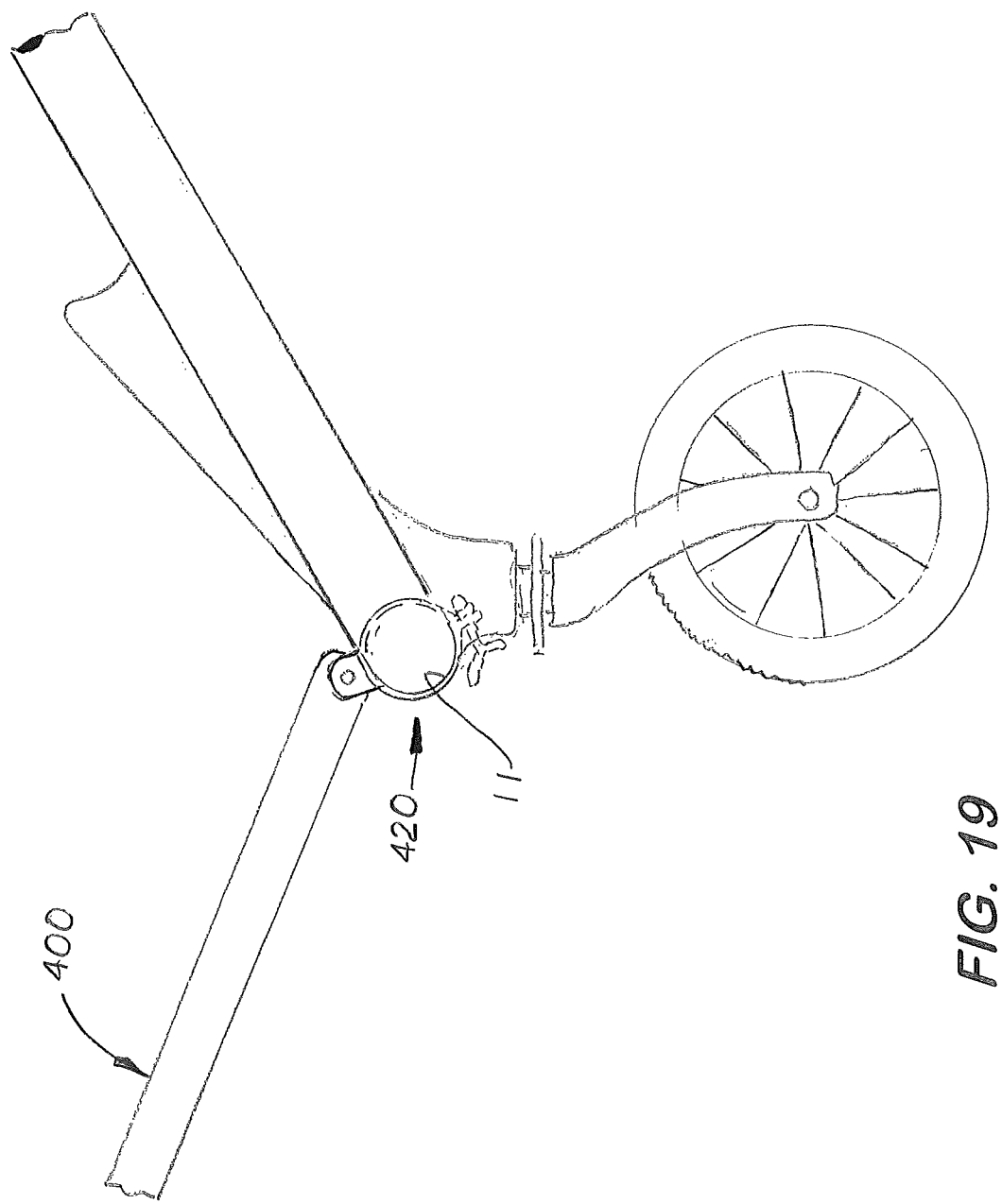
FIG. 19 is a side elevational view of the front section of the three wheel stroller shown in FIG. 18 showing the clamp attached to the front cross-member.
Figure 20:
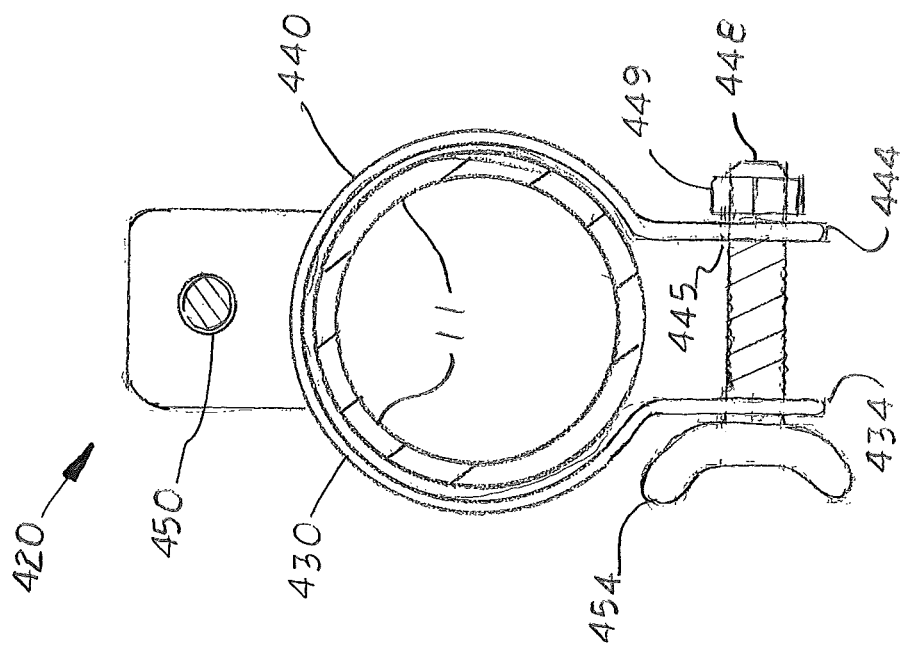
FIG. 20 is a side elevational view of the clamp shown in FIGS. 19 and 20.

FIGS. 20 and 21 is a side elevational view and a front elevational view, respectively, of the bracket 420 shown in FIGS. 19 and 20. The half circular member 420 includes two half-circular members 430, 440 connected together via by a peg 450. Each section 430, 440 includes an upper arm 436, 446, respectively that extends upward. The half-circular members 430, 440, when joined fit tightly around the front frame member 11 on the stroller 10'.

Integrally formed or attached to each half-circular member 430, 440 is a downward plate 434, 444, respectively. Formed on the front plate 434 is a slot 435. Formed on the rear plate 444 is a bore 445. Extended through the bore 445 is a threaded bolt 448 with a nut 449 attached to one end. Attached to the opposite end of the bolt 448 is a wing nut 454 that allows the user to manually tighten the wing nut 454 to press the two half circular members 432, 442 together and lock the bracket 420 around the front frame member 11.

The two half-circular members 436, 446 are parallel and aligned with the stroller's front to rear axis 12. The upper arms 436, 446 are spaced apart so that a telescopic (shown) handle member 400 or a fixed length handle (not shown) may extend between them and attached to the pin 450. The handle member 400 is configured to rotate in an approximately 120 degree arc from the front frame member 11.

In all embodiments, a person 95 can walk in front or walk to aside and adjacent to a front wheel and pull the stroller 10 or 10'. The person 95 can still push the stroller 10, 10' from behind in a normal pushing position. During normal use, the handle members 80, 120, 200 and 400 are rotated forward and aligned approximately 20 to 30 degrees above the horizontal axis. The length of the handle members 80, 120, 200, and 400 are approximately 24 to 36 inches in length so the person's feet are located sufficiently in front of the stroller's front wheels to prevent tripping. The support bar 50, the hinge assembly 55, the handle members 80, 120, 200 and 400 may be made of wood, metal, plastic or fiberglass.

It should be understood that a single handle member 200 may be attached to one front frame member 16 or 18 or to each frame member 16, 18. It should also be understood that each handle member may be a fixed length or adjustable in length. The hand grip may be straight, J-shaped or T-shaped. It should also be understood that the bracket 420 used in the fifth embodiment, is but one of several attachment mechanism that can attach the handle member 400 to the front frame member 11. The attachment mechanism may be or temporarily attached as shown, or permanently attached.

In compliance with the statute, the invention described has been described in language more or less specific on structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A pulling handle system for a stroller, comprising;
   a. a stroller with a frame that includes two diagonally aligned, parallel side frames, a seat transversely aligned between the two side frames configured to hold a child, at least one fixed rearward extending handle attached to said frame, and three or more wheels attached to said frame and configured to roll over a support surface when said stroller is pushed or pulled;
   b. a support bar with two opposite ends transversely aligned and temporarily attached at its said opposite ends to said side frames and at a location below the seat; and
   c. an elongated handle member pivotally attached at one end to said support bar, said handle member being sufficient in length so that when said handle member is pivoted and extended in a forward direction from said stroller, an individual walking in front of the stroller may grasp an end of said handle member opposite said end attached to said support bar and pull said stroller.

2. The pulling handle system, as recited in claim 1, wherein said handle member is a fixed length.

3. The pulling handle system, as recited in claim 1, wherein said handle member is adjustable in length.

4. The pulling handle system, as recited in claim 1, wherein said stroller is a four wheel stroller.

5. The pulling handle system, as recited in claim 1, wherein said stroller is a three wheel stroller.

* * * * *